United States Patent
Hill et al.

(10) Patent No.: US 7,647,273 B1
(45) Date of Patent: Jan. 12, 2010

(54) METHOD FOR PROVIDING A LIQUIDITY FACILITY

(75) Inventors: James John Hill, Chappaqua, NY (US); Tammy Serbee, Hastings-On-Hudson, NY (US); Serkan Savasoglu, New York, NY (US); Jane Guttridge, Westport, CT (US)

(73) Assignee: Morgan Stanley, New York, NY (US)

(*) Notice: Subject to any disclaimer, the term of this patent is extended or adjusted under 35 U.S.C. 154(b) by 224 days.

(21) Appl. No.: 11/446,859

(22) Filed: Jun. 5, 2006

(51) Int. Cl.
    *G06Q 40/00* (2006.01)
(52) U.S. Cl. ............................... 705/38
(58) Field of Classification Search ............... 370/230; 399/27, 30, 49, 58; 455/7, 558; 705/1–45; 706/45; 716/4, 5, 10
    See application file for complete search history.

(56) References Cited

U.S. PATENT DOCUMENTS

| | | | |
|---|---|---|---|
| 7,392,220 B1* | 6/2008 | Altarescu | 705/38 |
| 2003/0135450 A1* | 7/2003 | Aguais et al. | 705/38 |
| 2004/0205021 A1 | 10/2004 | Cahill et al. | |
| 2005/0144117 A1* | 6/2005 | Misra et al. | 705/38 |
| 2006/0074786 A1* | 4/2006 | Zusy et al. | 705/35 |
| 2006/0080193 A1 | 4/2006 | McMurtray et al. | |
| 2006/0080217 A1* | 4/2006 | Blackall et al. | 705/37 |
| 2006/0253361 A1* | 11/2006 | Robinson et al. | 705/35 |
| 2006/0253386 A1* | 11/2006 | Rothman et al. | 705/38 |

OTHER PUBLICATIONS

Financial Innovation and Risk Management: An Introduction to Credit Derivatives, Journal of Applied Finance v15n1 pp. 52-63, Spring 2005.*
CDO Transactions Structural Basics, Securitization Conduit v5n1-4 pp. 18-37, 2002.*

* cited by examiner

*Primary Examiner*—Mary Cheung
*Assistant Examiner*—Tien C Nguyen
(74) *Attorney, Agent, or Firm*—K & L Gates LLP

(57) ABSTRACT

A method of providing a liquidity facility for a business entity is disclosed. According to various embodiments, the method comprises offering for sale a unit issued by an issuer. Each unit comprises a credit linked note, wherein the credit linked note is linked to the credit of the business entity. Interest on the notes is funded, at least in part, from (1) income received by the issuer from an interest rate swap counter-party under an interest rate swap agreement, wherein the issuer pays the interest rate swap counter-party income received on assets held by the issuer, wherein the assets are purchased using proceeds from the issuance of the units, and (2) payments from the business entity to the issuer pursuant to a credit agreement between the business entity and the issuer.

20 Claims, 3 Drawing Sheets

METHOD FOR PROVIDING A LIQUIDITY FACILITY

BACKGROUND

Figure 1:
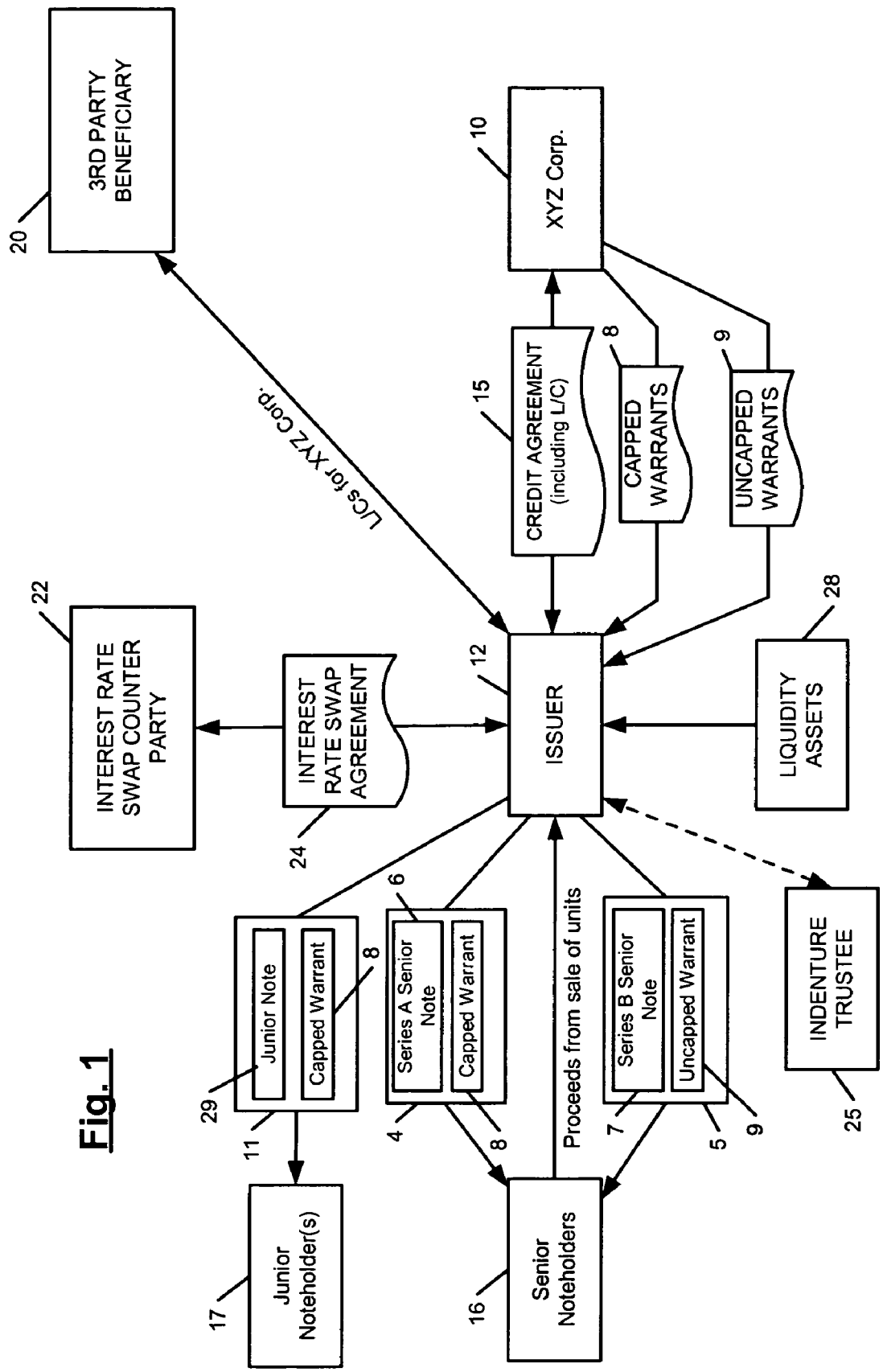

It is usually desirable for a company to have access to a readily available source of funding. One way that a company can achieve liquidity is to raise capital through a debt offering. Debt offerings raise money immediately at the time of the offering, but to the detriment of the company's balance sheet. In some instances, the company does not immediately need the money—it just needs access to the funds in the future—and would prefer not to negatively affect its balance sheet by doing a debt offering. Thus, debt offerings are not preferred in some circumstances. Another option is a letter of credit from a lending institution. For some companies, however, particularly companies with a poor credit rating, this is also not a practical option. Accordingly, other mechanisms for gaining access to sources of funding are needed.

SUMMARY

In one general aspect, the present invention is directed to methods for providing a liquidity facility for a business entity. According to various embodiments, an issuer issues units to investors for cash. The units may comprise senior units and junior units. Each unit comprises a credit linked note and a warrant. The credit linked note is linked to the credit of the business entity. The warrant entitles the holder of the warrant to receive a payment (either in cash and/or in stock) based on the price of a share of stock of the business entity on a specified exercise date or earlier under certain conditions. For different series of units offered by the issuer, the warrants may be capped or uncapped. Also, the credit linked notes of the junior units may be subordinate to the credit linked notes of the senior units.

With the proceeds from the offering of the units, the issuer purchases assets, referred to herein as "Liquidity Assets." The Liquidity Assets are preferably highly-rated, interest-bearing assets, such as shares in a money market fund. Also at closing, the issuer enters into a revolving credit agreement with the business entity. The credit agreement allows the business entity to, among other things, borrow money from the issuer up to the commitment amount under the credit agreement, which commitment amount may match the proceeds raised by the issuer by issuing the units. When the business entity borrows money from the issuer under the credit agreement, the issuer, through an indenture trustee, may sell all or a portion of the Liquidity Assets to fund the amount borrowed.

The credit agreement may also require, according to various embodiments, the issuer to issue letters of credit ("L/Cs") to a third party on behalf of the business entity. When the third party draws on a L/C issued by the issuer, the issuer may similarly fund the draw by selling all or a portion of the Liquidity Assets then held by the issuer. Such drawn amount would then constitute a borrowing under the credit agreement. In other embodiments, a financial institution may issue L/Cs on behalf of the business entity, where the issuer participates in the funding of any amount drawn on such L/Cs by selling all or a portion of the Liquidity Assets.

The credit agreement may require the business entity to pay (i) interest on any amounts drawn under the credit agreement (including amounts borrowed by the business entity and amounts drawn by a third party pursuant to a L/C provided to the third party on behalf of the business entity pursuant to the credit agreement) and (ii) facility (or commitment) fees on the undrawn amount.

Also at closing, the issuer may enter into an interest rate swap agreement with an interest rate swap counter-party. Under the interest rate swap agreement, the issuer may exchange the interest income it receives on the Liquidity Assets for a floating interest rate based on the Liquidity Assets then held by the issuer. The floating interest rate may be based on a published rate, such as LIBOR.

The issuer may fund the interest payments on the credit linked notes with (1) amounts received from the interest rate swap counter-party under the interest rate swap agreement, (ii) the interest payments from the business entity under the credit agreement for amounts drawn on the credit agreement, and/or (iii) the facility (or commitment) fees paid by the business entity to the issuer under the credit agreement.

According to various embodiments, the present invention is directed to a process that includes offering or purchasing one or more of the units issued by the issuer for sale. The offering or purchasing may be part of the initial offering by the issuer or an offering by a party other than the issuer in the secondary market. Also, embodiments of the invention are directed to arranging such a transaction.

FIGURES

Figure 2:
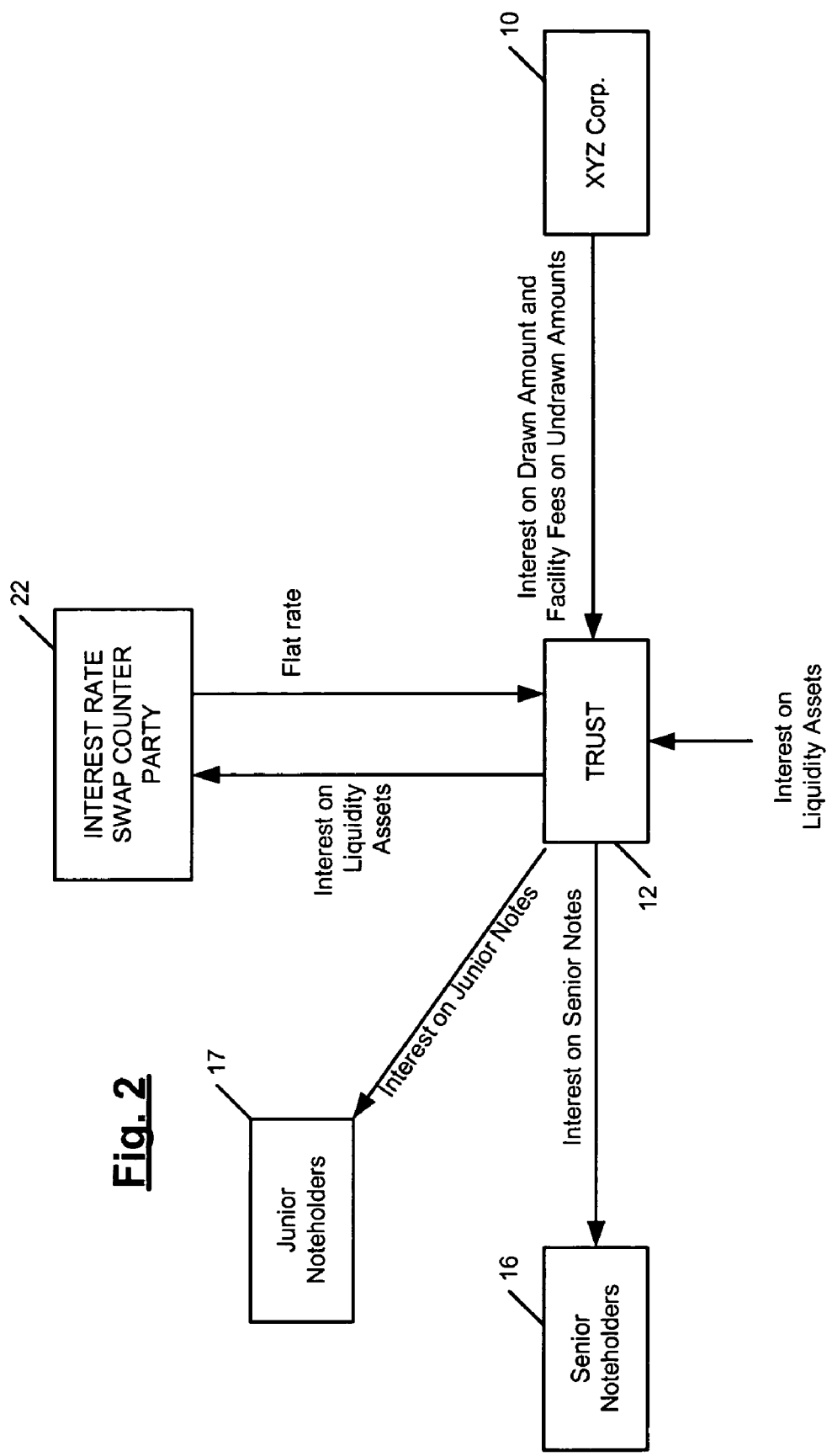
Figure 3:
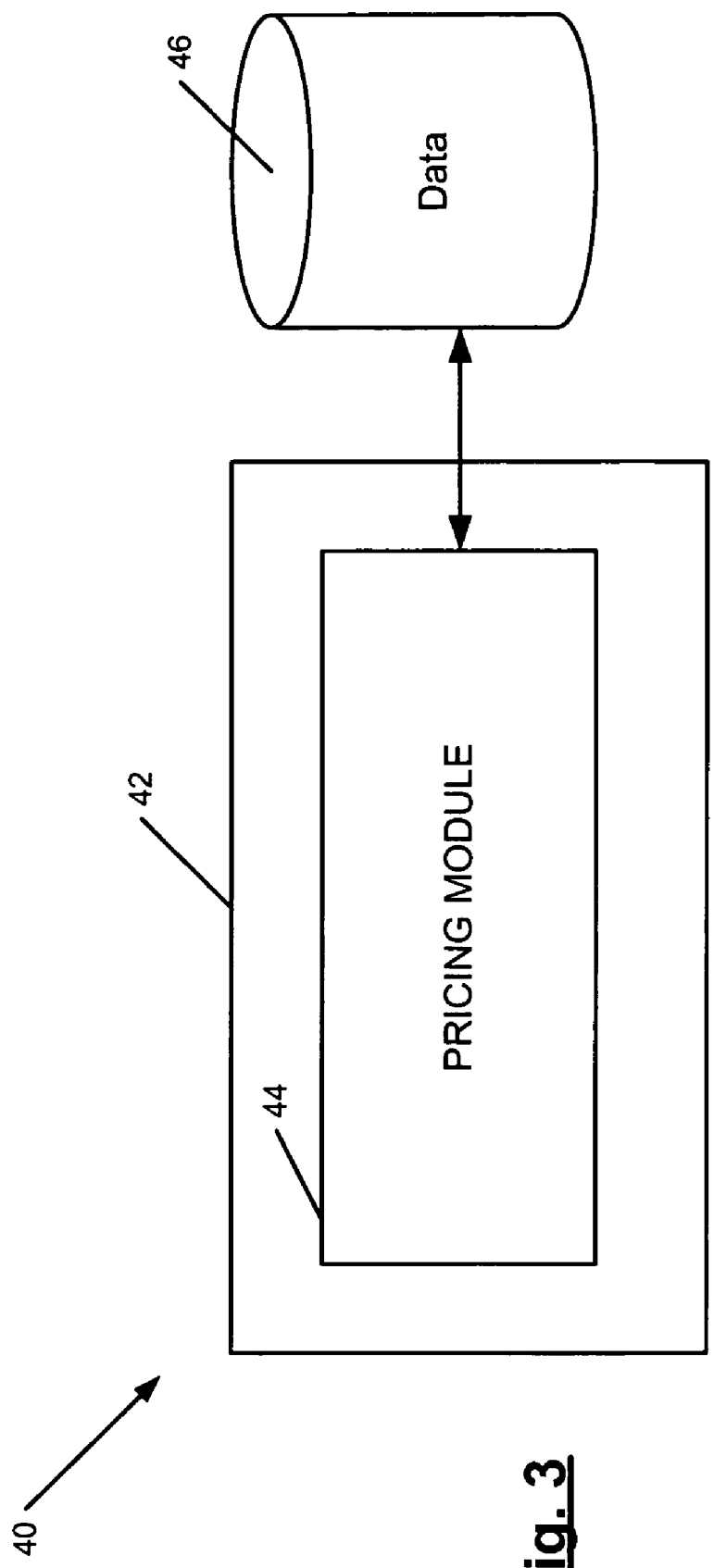

Various embodiments of the present invention are described herein by way of example in conjunction with the following figures, wherein:

FIGS. 1 and 2 are diagrams illustrating a transaction structure according to various embodiments of the present invention; and FIG. 3 is a diagram of a computer system according to various embodiments of the present invention.

DETAILED DESCRIPTION

FIG. 1 is a diagram of a transaction structure according to various embodiments of the present invention. The transaction structure may be intended to provide a liquidity facility for a business entity, such as a corporation, partnership, etc. In FIG. 1, the business entity for which the transaction structure provides the liquidity facility is denoted as XYZ Corp. 10. XYZ Corp. may utilize the transaction structure in order to gain access to liquidity so that it has access to sufficient liquid funds if needed at some point in the future without detrimental effect to its balance sheet.

As shown in FIG. 1, according to the transaction structure, an issuer 12 issues senior units 4, 5 to one or more senior noteholders 16 and issues junior units 11 to one or more junior noteholders 17. The issuer 12 may be, for example, a trust, such as offshore special purpose vehicle ("SPV").

The senior units 4, 5 may comprise a combination of credit linked notes 6, 7 and warrants 8, 9. A credit linked note is a security that offers investors the opportunity to get credit exposure to a reference credit, such that the return of principal is linked to whether the reference credit has suffered certain defaults (usually bankruptcy or a failure to pay on borrowed money in excess of $1,000,000). In the case of a default, the noteholders' principal is reduced by losses calculated with respect to a bond or loan of such reference credit meeting certain criteria. Such losses are typically calculated following an auction process. In this case, the referenced credit may be XYZ Corp. 10. The warrants 8, 9 may entitle the holder thereof (e.g., the noteholders 16) to receive a payment (in cash or shares of XYZ Corp. stock, at XYZ Corp.'s option) based on the price of XYZ Corp. common stock upon exercise. The senior units 4, 5 may be delivered on the closing data for the transaction. In addition, embodiments, other types of call options besides warrants may also be used.

According to one embodiment, the issuer 12 may issue Series A senior units 4 and Series B senior units 5. The Series A units 4 may comprise a Series A floating rate senior credit linked note 6 and a capped warrant 8. The capped warrants 8 may entitle the holder thereof to a value upon exercise that is capped, such that a capped warrant holder will not benefit in any price appreciation of XYZ Corp. common stock above a specified cap price. The Series B units 5 may comprise a Series B floating rate senior credit linked note 7 and an uncapped warrant 9.

The notes 6, 7 may pay an interest rate of, for example, 3-month LIBOR+X % during the term of the notes. The Series A notes 6 may pay a higher rate than the Series B notes 7. The term of the notes 6, 7 may be, for example, three years, or some other length of time.

The issuer 12 may also raise additional capital through the offering of junior units 11, comprising floating rate junior credit linked notes 29 and capped warrants 8. The junior notes 29 are subordinate to the senior notes 6, 7 that are part of the senior units 4, 5 respectively. Also, the term of the junior notes 29 may match the term of the senior notes 6, 7, and the exercise date and cap price of the capped warrants of the junior units 11 may match the exercise date and cap price, respectively, of the capped warrants 8 of the senior units 4. The junior notes 29 may pay a higher rate than the senior notes 6, 7.

Holders of the senior units 4, 5, at any time following the closing date, may separate the notes 6, 7 and the warrants 8,9 then held in unit form, and thereafter trade the notes 6, 7 and warrants 8, 9 independently from each other and from the other senior units 4, 5. In addition, at any time following closing, senior units may be recreated from separate notes 6, 7 and warrants 8, 9 not already held as units 4, 5. Following such recreation, the notes 6, 7 and warrants 8, 9 constituting such recreated units 4, 5 may only trade in unit form unless later separated again. The same separation and/or recreation capabilities may also apply to the junior notes 11.

With the proceeds from the sale of the senior units 4, 5 and the junior units 11, the issuer 12 may purchase assets, preferably highly rated, interest-bearing assets 28, such as shares in a money market fund or bonds (hereinafter "Liquidity Assets"). Thus, for example, if the issuer 12 sold $750MM in units 4, 5, 11, the issuer 12 may than invest the $750MM in a AAA-rated money market fund.

Both the senior notes 6, 7 offered as part of the senior units 4, 5 and the junior notes 29 issued as part of the junior units 11 may be issued, according to various embodiments, under an indenture, to be dated the closing date of the offering, between the issuer 12 and an indenture trustee 25.

In addition, the issuer 12 may enter into a credit agreement 15 with XYZ Corp. 10 on the closing date. The credit agreement 15, according to various embodiments, may contain a letter of credit ("L/C") facility under which the issuer 12 may issue L/Cs on XYZ Corp.'s behalf to one or more third parties 20. The commitment of the credit agreement 15 may match the amount raised by the issuer 12 in offering the units 4, 5, 11. Thus, for example, if the issuer 12 raises $750MM offering the units 4, 5,11, the commitment of the credit agreement 15 may be $750MM. Under the credit agreement 15, the issuer 12 may be obligated to make, from time to time, cash loans to XYZ Corp. 10 not to exceed the available commitment under the credit agreement. The issuer 12 may sell all or a portion of the Liquidity Assets 28 to fund loans to XYZ Corp. 10 under the credit agreement 15. Interest payable on drawn amounts under the credit agreement 15 may be, for example, 3-month LIBOR plus Y %. Also, the credit agreement 15 may require XYZ Corp. 10 to pay facility fees of Z % to the issuer 12 on the undrawn amount. In one embodiment, the interest rate on the drawn amount may be LIBOR+Y %) and the facility fee rate on the undrawn amount may be Y %.

Under the L/C agreement that is part of the credit agreement 15, the issuer 12 may be obligated to issue, from time to time, L/Cs as directed by XYZ Corp. 10 in an aggregate amount not to exceed the available commitment under the credit agreement 15. In order to fund any such drawing, according to various embodiments, the issuer 12 (through the indenture trustee 25) may sell all or a portion of the Liquidity Assets 28. The term of the credit agreement 15 may match the term of the senior units 4, 5. At maturity, XYZ Corp. 10 may be required to pay the outstanding principal balance of loans under the credit agreement 15 to the issuer 12.

As used herein, the "available commitment" under the credit agreement 15 refers to the original commitment amount of the credit agreement 15 at closing, less any outstanding drawn amounts and any outstanding but undrawn L/Cs. For example, if the original commitment is $750MM, and XYZ Corp. 10 subsequently borrows $100MM under the credit agreement 15, and if there are no outstanding L/Cs, the then available commitment is $650MM. If XYZ Corp. 10 subsequently repays $50MM of the $100MM that was borrowed (without borrowing any additional amounts and without any L/Cs being drawn upon), the then available commitment would increase in this example to $700MM. As a further example, if the issuer 12 then issues a L/C on behalf of XYZ Corp. 10 under the credit agreement 15 for $75MM, the then available commitment would be $625MM.

According to various embodiments, the warrants 8, 9 that are part of the senior units 4, 5, as well as the warrants 8 that are part of the junior units 11, are securities of XYZ Corp. 10 that the issuer 12 preferably acquires on the closing date (as shown in FIG. 1). The issuer 12 may have no obligations under the warrants 8, 9. Subject to certain exceptions, the warrants 8, 9 may only be exercisable on their expiration date, which, according to various embodiments, corresponds to the scheduled maturity date of the notes 6, 7. In the case of the capped warrants 8, the value received upon exercise is capped such that holders of the capped warrants 8 will not benefit from any increase in the common stock of XYZ Corp. 10 beyond a specified cap price.

In another embodiment, a financial institution (not shown) may issue L/Cs on behalf of XYZ Corp. 10 under the credit agreement 15 to third parties 20, where the issuer 12 participates in the funding of any amount drawn on such L/Cs by third parties 20 under the credit agreement 15 by selling all or a portion of the Liquidity Assets 28. Such amounts drawn would similarly constitute a borrowing under the credit agreement 15.

In addition, as shown in FIG. 1, on the closing date the issuer 12 may enter into an interest rate swap agreement 24 with an interest rate swap counter-party 22. Pursuant to the interest rate swap agreement 24, the issuer 12 may pay the income from the Liquidity Assets 28 to the interest rate swap counter-party 22 in exchange for a floating interest rate (e.g., LIBOR-based) based on the Liquidity Assets 28 then held by the issuer 12. For example, in an embodiment where under the credit agreement the interest rate paid by XYZ Corp. 10 on the drawn amount is LIBOR+Y %, and the facility fee rate on the undrawn amount is Y %, the rate paid by the interest rate swap counter-party 22 may be LIBOR, so that the rates on both the drawn and undrawn amounts secured by the issuer 12 equal LIBOR+Y %. In addition, a third-party guarantor (not shown) may guarantee the payment obligations of the interest rate swap counter-party 22.

According to various embodiments, all of the assets of the issuer 12, including the Liquidity Assets 28, may be pledged: (i) equally and ratably, on a first lien basis, to (A) the interest rate swap counter-party 22 and (B) to secure the issuer's obligations to make disbursements to beneficiaries of L/Cs issued by the issuer 12 under the credit agreement 15; (ii) on a second lien basis to the indenture trustee 25 to secure the issuer's obligations to the senior noteholders 16 in respect of the notes 6, 7; and (iii) on a third lien basis to the indenture trustee 25 to secure the issuer's obligations to the junior noteholders 17 in respect of the junior notes 29.

According to various embodiments, upon receipt of a notice of borrowing by XYZ Corp. 10 under the credit agreement 15, or upon a draw upon a letter of credit issued by the issuer 12 on behalf of XYZ Corp. 10, the indenture trustee 25 will, on behalf of the issuer 12, redeem all or a portion of the Liquidity Assets 28, the proceeds of which may be used to fund the loan to XYZ Corp. 10 or the issuer's funding of such L/C drawing, as the case may be. The sale of Liquidity Assets 28 will reduce or eliminate the amount of the Liquidity Assets 28 available to repay the notes 6, 7, 29 upon their scheduled maturity. If XYZ Corp. 10 repays any outstanding loan or reimbursement obligation prior to maturity under the terms of the credit agreement, the indenture trustee 25 will, according to various embodiments, on behalf of the issuer 12, use those payments to purchase additional Liquidity Assets 28.

Interest payment on the notes 6, 7, 29 may be payable, according to various embodiments, from amounts received by the issuer 12 from (i) XYZ Corp. 10 under the credit agreement 15, consisting of interest on any drawn amounts thereunder and facility fees on any undrawn amounts thereunder, and (ii) the interest rate swap counter-party 22 under the interest rate swap agreement 24 consisting of, for example, 3-month LIBOR payments based on an amount equal to undrawn amounts under the credit agreement 15 (which may correspond to the amount of the Liquidity Assets 28 then held by the issuer 12). The aggregate amount of these payments (after the issuer 12 has paid the interest rate swap counter-party under the interest rate swap agreement 24 amounts equal to interest earned on the Liquidity Assets) is preferably equal to the aggregate amount of interest due on all the series of notes (e.g., the senior notes 6, 7 and the junior notes 29). To the extent Liquidity Assets 28 have been sold to fund loans and L/C drawings under the credit agreement 15, the principal amount payable on the notes 6, 7, 29 at their scheduled maturity is preferably payable from amounts due to the issuer 12 from XYZ Corp. 10 under the credit agreement 15.

According to various embodiments, if, on the maturity date of the notes 6, 7, 29, there are no outstanding loans or reimbursement obligations payable by XYZ Corp. 10 to the issuer 12 under the credit agreement 15, and if no amounts are due to or from the interest rate swap counter-party 22, the indenture trustee 25 may sell the Liquidity Assets 26 to pay the principal amount of the notes 6, 7, 29 due at maturity.

According to various embodiments, the terms of the junior notes 29 may provide that, upon the occurrence of a credit event with respect to XYZ Corp. 10, the junior noteholders 17 may have the right (but not necessarily the obligation) to deliver certain accelerated senior unsecured debt obligations of XYZ Corp. 10 ("deliverable obligations") in exchange for and in the same aggregate principal amount as the existing loans and reimbursement obligations under the credit agreement 15.

According to various embodiments, if, prior to maturity, a so-called "wind-up event" occurs, the notes 6, 7 may be, upon their acceleration by the senior noteholders 16, automatically redeemed in exchange for a pro rata portion of the assets of the issuer 12, subject to conditions related to priority of payments. If the credit agreement 15 is fully drawn and the issuer 12 has funded drawings on L/Cs, there will be no Liquidity Assets 28 remaining as assets for the issuer 12 on the wind-up event date following a wind-up event. In that event, the issuer 12 may exchange each note 6, 7 for a pro rata share of assignments under the credit agreement 15 (or deliverable obligations of XYZ Corp. 10 if the wind-up event is the result of a credit event and the junior noteholder(s) 17 has exercised its right to exchange loans and reimbursement obligations under the credit agreement 15 for deliverable obligations) subject to conditions related to priority of payments. The senior noteholders 16 may, therefore, upon a wind-up event, be entitled to exercise rights and remedies directly against XYZ Corp. 10 as lenders under the credit agreement 15 (or under the terms of the deliverable obligations, as applicable).

It should be noted that, according to various embodiments, XYZ Corp. 10 may be able to draw any undrawn amounts and the beneficiaries of L/Cs may draw on such L/Cs under the credit agreement 15 following the occurrence of any event that may or will cause a wind-up event, in which case, at the time of any wind-up event date none of the assets of the issuer 12 will likely be Liquidity Assets 28.

If the credit agreement 15 is not fully drawn or the issuer 12 has not funded drawn L/Cs on the wind-up event date, and the issuer 12 then holds the Liquidity Assets 28, the indenture trustee 25 may, according to various embodiments, sell the Liquidity Assets 28 in order to make principal and accrued and unpaid interest payments to the senior noteholders 16, subject to conditions related to priority of payments. Pursuant to the subordination terms of the junior notes 29, the senior noteholders 16 may be entitled to receive cash payments prior to the junior noteholder(s) 17. In addition, following the exchange of the notes 6, 7, pursuant to the terms of the credit agreement 15, the loans and reimbursement obligations distributed to the junior noteholder(s) 17 under the credit agreement 15 may be subordinated in right of payment to the loans and reimbursement obligations distributed to the senior noteholders 16.

According to various embodiments, although all wind-up events may have the effect of terminating the commitment in whole under the credit agreement 15, certain of those events may not accelerate outstanding loans and reimbursement obligations made to XYZ Corp. 10. In this case, assignments under the credit agreement 15 made to the senior noteholders 16 upon exchange of their notes 6, 7 following a wind-up event may be in respect of performing loans and reimbursement obligations under the credit agreement 15. Other wind-up events may accelerate all outstanding loans and reimbursement obligations under the credit agreement 15. Unless XYZ Corp. 10 pays all such loans and reimbursement obligations on or prior to the wind-up event date, the loans and reimbursement obligations distributed to the senior noteholders 16 may be non-performing.

A "wind-up event" may occur upon the termination of the commitment under the credit agreement 15. The circumstances under which the commitment under the credit agreement 15 may or will be terminated, according to various embodiments, include: (i) the occurrence of an event of default under the credit agreement 15, which may include the bankruptcy of XYZ Corp. 10; (ii) the occurrence of a credit event with respect to XYZ Corp. 10 as described in the credit agreement 15; (iii) an indenture event of default under the indenture; and (iv) the occurrence of an event of default or termination event under the interest rate swap agreement 24. In addition, upon the occurrence of a fundamental change with respect to XYZ Corp. 10 (which may be defined in the documentation associated with the transaction), each of the senior noteholders 16 may have the right to require the issuer 12 to repurchase all or a portion of their senior notes 6, 7 and each junior noteholder(s) 17 may be entitled to purchase each such senior note tendered. The issuer 12 may pay each such senior noteholder a cash repurchase price equal to the principal amount of the senior notes 6, 7 to be repurchased that is not purchased by a junior noteholder, plus accrued and unpaid interest thereon. In the event of such a fundamental change, the issuer 12 may have a right to terminate the commitment under the credit agreement 15 and cause XYZ Corp. 10 to prepay outstanding loans and reimbursement obligations thereunder. The failure by XYZ Corp. 10 to pay such amounts when due may constitute an event of default under the credit agreement 15.

Upon the occurrence of a wind-up event that is not a credit event, a majority of the senior noteholders (unless junior noteholders 17 purchase all of the senior notes 6, 7) may elect to have senior notes 6, 7 redeemed in exchange for a pro rata distribution of the assets of the issuer 12, subject to conditions relating to priority of payments and the subordination provisions of the junior notes 29. Upon the occurrence of a wind-up event that is a credit event, such redemption may occur automatically. To the extent that the credit agreement 15 has been drawn or L/Cs have been funded on or prior to the wind-up event date, then a corresponding portion of the assets of the issuer 12 will consist of loans and reimbursement obligations under the credit agreement 15 (or deliverable obligations, to the extent the junior noteholder(s) 17 has exercised its right to deliver deliverable obligations under the terms of the junior notes 29). The market value of such assets may be significantly less than the principal amount of the senior notes 6, 7. Certain wind-up events, such as the occurrence of an event of default under the credit agreement 15, may accelerate all outstanding loans and reimbursement obligations under the credit agreement 15, in which case the loans and reimbursement obligations distributed to senior noteholders 16 may be non-performing. Other wind-up events, such as the occurrence of a credit event (other than a credit event that also constitutes an event of default under the credit agreement 15, which may be treated as an event of default under the credit agreement 15), an indenture event of default (other than an event of default under the credit agreement 15, which may be treated as an event of default under the credit agreement 15) or an event of default or termination event under the interest rate swap agreement 24, will not accelerate the loans and reimbursement obligations under the credit agreement 15, in which case any such loans and reimbursement obligations distributed to the senior noteholders 16 may be performing.

Upon any such exchange, the issuer 12 may distribute to senior noteholders 16 pro rata assignments in loans and reimbursement obligations of XYZ Corp. 10 under the credit agreement 15 (or deliverable obligations, as applicable, if the junior noteholder(s) 17 has exercised its rights under the terms of the junior notes 29) on the basis of the priority of payments and subordination of the junior noteholder(s) 17 to the senior noteholders 16. Following such exchange, the senior noteholders 16 may be entitled to exercise rights and remedies directly against XYZ Corp. 10 as lenders under the credit agreement 15 or under the terms of the deliverable obligations, as applicable. To the extent there are any Liquidity Assets 28 available for distribution on the wind-up event date, holders of the senior notes 6, 7 may be first entitled to receive such Liquidity Assets 28 pursuant to the subordination provisions of the junior notes 29.

FIG. 2 illustrates the flows during the term of the transaction structure according to various embodiments of the present invention. The issuer 12 pays interest on the senior notes 6,7 to the senior noteholders 16. Additionally, as shown in FIG. 2, the issuer 12 may make interest payments on the junior notes 29 to the junior noteholders 17. In addition, the issuer 12 receives income on the Liquidity Assets 28, which it exchanges with the interest rate swap counter-party 22 under the interest rate swap agreement 24 for a, for example, LIBOR-based interest rate.

Under the credit agreement 15, XYZ Corp. 10 pays the issuer an interest rate on any outstanding amounts drawn under the credit agreement 15 plus facility (or commitment) fees on the undrawn amount.

According to other embodiments, the Liquidity Assets 28 may pay a published floating rate (e.g., a LIBOR-based rate) that may be the same published floating rate comprising interest on the notes 6, 7, in which case the interest rate swap agreement could be eliminated.

An "event of default" of the credit agreement may be defined in the credit agreement 15 to generally include (i) the bankruptcy of XYZ Corp. 10, (ii) the breach of certain covenants under the credit agreement 15, (iii) material inaccuracies of representations made by XYZ Corp. 10 under the credit agreement 15, (iv) failure to prepay amounts due in connection with a fundamental change, and (v) a default with respect to certain other debt of XYZ Corp. 10. The occurrence of an event of default may, according to various embodiments, accelerate all outstanding loans and reimbursement obligations under the credit agreement 15.

A "credit event" may be defined in the credit agreement 15 as (i) a bankruptcy of XYZ Corp. 10 or (ii) a failure to pay (after the applicable grace period) by XYZ Corp. 10 with respect to borrowed money in excess of a specified amount (e.g., $1,000,000). The occurrence of a credit event may, according to various embodiments, terminate the commitment of the issuer 12 under the credit agreement 15 but not necessarily accelerate outstanding loans and reimbursement obligations under the credit agreement 15 (unless such credit event also constitutes an event of default under the credit agreement 15).

FIG. 3 is a diagram of a computer system 40 according to various embodiments of the present invention. The computer system 40 may include a computing device 42, which may be implemented as one or a number of networked computers, such as personal computers, servers, etc. The system 42 may include a pricing module 44. The module 44 may be implemented as software code to be executed by a processor (not shown) of the computing device 42 using any suitable computer language. The software code may be stored as a series of instructions or commands on a computer-readable medium, such as a random access memory (RAM), a read-only memory (ROM), a magnetic medium such as a hard drive or a floppy disk, or an optical medium, such as a CD-ROM or DVD-ROM.

The pricing module 44 may, for example, assist in the determination of the price (e.g., the rate) of the various agreements in the transaction structures described above. For example, the pricing module 44 may compute the appropriate rates for the interest rate swap agreement 24 and the credit agreement 15 based on current rates, the term of the swap contract, etc. according to, for example, conventional pricing techniques. The market information used in the pricing calculations may be stored in a database 46 or the pricing module 44 may read that information from other sources, e.g., files sent to the pricing module 44 over a data network (not shown). Also, a user may input relevant data for the pricing determination. The pricing module 44 may also compute return rates for the agreements in a similar manner.

According to various embodiments, the present invention is directed to a process that includes selling or offering for sale and/or purchasing the units and/or constituent parts of the units offered by the issuer 12. This includes sales and offers in the aftermarket (or secondary market). Embodiments of the present invention are also directed to arranging the transaction, including underwriting the transaction.

While several embodiments of the invention have been described, it should be apparent, however, that various modifications, alterations and adaptations to those embodiments may occur to persons skilled in the art with the attainment of some or all of the advantages of the present invention. Accordingly, the foregoing disclosure, description, and figures are for illustrative purposes only, and do not in any way limit the invention, which is defined only by the claims. For example, certain steps associated with the transactions described above may be performed in various orders or simultaneously. Also, the example rates and principal amounts described above are illustrative and not limiting.

What is claimed is:

1. A computer-implemented method for facilitating the providing of a liquidity facility for a business entity, the method comprising:
    offering for sale a unit issued by an issuer, wherein the unit is one of a plurality of units issued by the issuer, wherein each unit comprises a credit linked note, wherein the credit linked note is linked to the credit of the business entity, and wherein interest on the note is funded, at least in part, from:
        income derived from assets purchased with proceeds from the units issued by the issuer; and
        payments from the business entity to the issuer pursuant to a credit agreement between the business entity and the issuer that allows the business entity to borrow money from the issuer up to a commitment amount that is based on proceeds raised by the issuer from the sale of the plurality of units, wherein some or all of the assets are to be liquidated to fund borrowing by the business entity under the credit agreement, wherein the payments from the business entity to the issuer pursuant to the credit agreement comprise interest payment on an amount of funds drawn under the credit agreement and fees on an undrawn amount under the credit agreement; and
    calculating, by a computer device, a rate for the credit agreement, wherein the computer device comprises a processor and a memory, wherein the memory stores instructions that when executed by the processor causes the processor to calculate the rate for the credit agreement, wherein the computer device is programmed to calculate the rate based on market data stored in a database that is in communication with the computer device.

2. The method of claim 1, wherein income derived from the assets purchased with the proceeds from the units issued by the issuer comprises income received by the issuer from an interest rate swap counter-party under an interest rate swap agreement, wherein the issuer pays the interest rate swap counter-party income received on the assets held by the issuer.

3. The method of claim 2, wherein the amount drawn under the credit agreement comprises at least one of:
    an amount loaned by the issuer to the business entity; or
    an amount drawn on a letter of credit issued on behalf of the business entity.

4. The method of claim 3, wherein each of the plurality of units comprise, in addition to the credit linked note, a warrant, wherein the warrant entitles the holder of the warrant to receive a payment based on the price of a share of stock of the business entity.

5. The method of claim 4, wherein the unit comprises a senior unit, and wherein the warrant of the senior unit is a capped warrant.

6. The method of claim 4, wherein the unit comprises a senior unit, and wherein the warrant of the senior unit is an uncapped warrant.

7. The method of claim 4, wherein the unit comprises a junior unit, and wherein the warrant of the junior unit is a capped warrant.

8. A computer-implemented method for facilitating the providing of a liquidity facility for a business entity, the method comprising:
    offering for sale a unit issued by an issuer, wherein the unit is one of a plurality of units issued by the issuer, and wherein each unit comprises:
        a credit linked note, wherein the credit linked note is linked to the credit of the business entity, and wherein interest on the note is funded, at least in part, from:
            income derived from assets purchased with proceeds from the issuance of the units; and
            payments from the business entity to the issuer pursuant to a credit agreement between the business entity and the issuer that allows the business entity to borrow money from the issuer up to a commitment amount that is based on proceeds raised by the issuer from the sale of the plurality of units, wherein some or all of the assets are to be liquidated to fund borrowing by the business entity under the credit agreement, wherein the payments from the business entity to the issuer pursuant to the credit agreement comprise interest payment on an amount of funds drawn under the credit agreement and fees on an undrawn amount under the credit agreement; and
        a warrant that entitles the holder of the warrant to receive a payment based on the price of a share of stock of the business entity; and
    calculating, by a computer device, a rate for the credit agreement, wherein the computer device comprises a processor and a memory, wherein the memory stores instructions that when executed by the processor causes the processor to calculate the rate for the credit agreement, wherein the computer device is programmed to calculate the rate based on market data stored in a database that is in communication with the computer device.

9. The method of claim 8, wherein income derived from the assets purchased with the proceeds from the units issued by the issuer comprises income received by the issuer from an interest rate swap counter-party under an interest rate swap agreement, wherein the issuer pays the interest rate swap counter-party income received on the assets held by the issuer.

10. The method of claim 9, wherein the credit linked note and the warrant are separable.

11. The method of claim 10, wherein the amount drawn under the credit agreement comprises at least one of:
    an amount loaned by the issuer to the business entity; or an amount drawn on a letter of credit issued on behalf of the business entity.

12. A computer-implemented method for facilitating the providing of a liquidity facility for a business entity, the method comprising:

purchasing a unit issued by an issuer, wherein the unit is one of a plurality of units issued by the issuer, wherein each unit comprises a credit linked note, wherein the credit linked note is linked to the credit of the business entity, and wherein interest on the note is funded, at least in part, from:

income derived from assets purchased with proceeds from the units issued by the issuer; and payments from the business entity to the issuer pursuant to a credit agreement between the business entity and the issuer that allows the business entity to borrow money from the issuer up to a commitment amount that is based on proceeds raised by the issuer from the sale of the plurality of units, wherein some or all of the assets are to be liquidated to fund borrowing by the business entity under the credit agreement, wherein the payments from the business entity to the issuer pursuant to the credit agreement comprise interest payment on an amount of funds drawn under the credit agreement and fees on an undrawn amount under the credit agreement; and calculating, by a computer device, a rate for the credit agreement, wherein the computer device comprises a processor and a memory, wherein the memory stores instructions that when executed by the processor causes the processor to calculate the rate for the credit agreement, wherein the computer device is programmed to calculate the rate based on market data stored in a database that is in communication with the computer device.

13. The method of claim 12, wherein income derived from the assets purchased with the proceeds from the units issued by the issuer comprises income received by the issuer from an interest rate swap counter-party under an interest rate swap agreement, wherein the issuer pays the interest rate swap counter-party income received on the assets held by the issuer.

14. The method of claim 13, wherein the amount drawn under the credit agreement comprises at least one of:

an amount loaned by the issuer to the business entity; or an amount drawn on a letter of credit issued on behalf of the business entity.

15. The method of claim 14, wherein each of the plurality of units comprise a warrant, wherein the warrant entitles the holder of the warrant to receive a payment based on the price of a share of stock of the business entity.

16. The method of claim 15, wherein the unit comprises a senior unit, and wherein the warrant of the senior unit is a capped warrant.

17. The method of claim 15, wherein the unit comprises a senior unit, and wherein the warrant of the senior unit is an uncapped warrant.

18. A computer-implemented method for facilitating the providing of a liquidity facility for a business entity, the method comprising:

purchasing a unit issued by an issuer, wherein the unit is one of a plurality of units issued by the issuer, and wherein each unit comprises:

a credit linked note, wherein the credit linked note is linked to the credit of the business entity, and wherein interest on the note is funded, at least in part, from:

income derived from assets purchased with proceeds from the issuance of the units; and payments from the business entity to the issuer pursuant to a credit agreement between the business entity and the issuer that allows the business entity to borrow money from the issuer up to a commitment amount that is based on proceeds raised by the issuer from the sale of the plurality of units, wherein some or all of the assets are to be liquidated to fund borrowing by the business entity under the credit agreement, wherein the payments from the business entity to the issuer pursuant to the credit agreement comprise interest payment on an amount of funds drawn under the credit agreement and fees on an undrawn amount under the credit agreement; and a warrant that entitles the holder of the warrant to receive a payment based on the price of a share of stock of the business entity; and calculating, by a computer device, a rate for the credit agreement, wherein the computer device comprises a processor and a memory, wherein the memory stores instructions that when executed by the processor causes the processor to calculate the rate for the credit agreement, wherein the computer device is programmed to calculate the rate based on market data stored in a database that is in communication with the computer device.

19. The method of claim 18, wherein income derived from the assets purchased with the proceeds from the units issued by the issuer comprises income received by the issuer from an interest rate swap counter-party under an interest rate swap agreement, wherein the issuer pays the interest rate swap counter-party income received on the assets held by the issuer.

20. The method of claim 19, wherein the amount drawn under the credit agreement comprises at least one of:

an amount loaned by the issuer to the business entity; or an amount drawn on a letter of credit issued on behalf of the business entity.

* * * * *

UNITED STATES PATENT AND TRADEMARK OFFICE
CERTIFICATE OF CORRECTION

PATENT NO. : 7,647,273 B1  Page 1 of 1
APPLICATION NO. : 11/446859
DATED : January 12, 2010
INVENTOR(S) : Hill et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 445 days.

Signed and Sealed this

Sixteenth Day of November, 2010

David J. Kappos
*Director of the United States Patent and Trademark Office*